Oct. 24, 1967   J. E. LOHSTOETER ETAL   3,348,599
APPARATUS FOR DEWATERING AND DEHYDRATING
SLIMES AND THE LIKE
Filed April 3, 1964   2 Sheets-Sheet 1
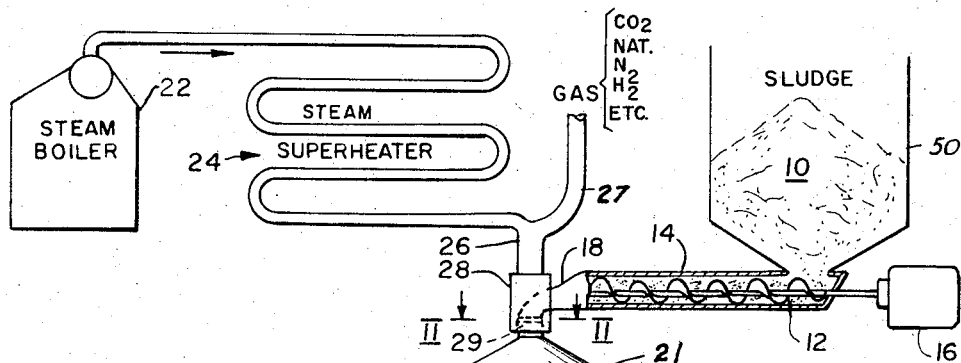
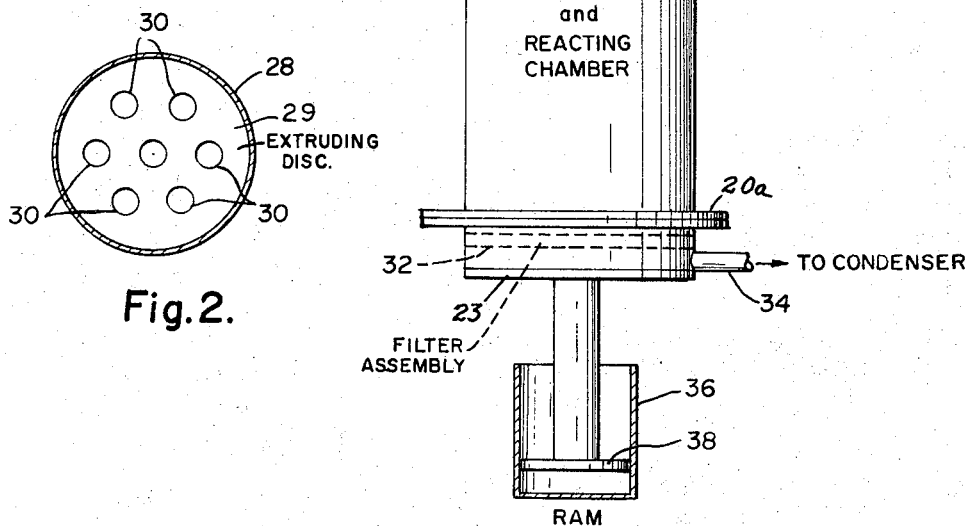
Fig.1.
Fig.2.
INVENTORS
JOHN E. LOHSTOETER &
JOHN L. YOUNG
ATTORNEY Oct. 24, 1967  J. E. LOHSTOETER ET AL  3,348,599
APPARATUS FOR DEWATERING AND DEHYDRATING
SLIMES AND THE LIKE
Filed April 3, 1964  2 Sheets-Sheet 2
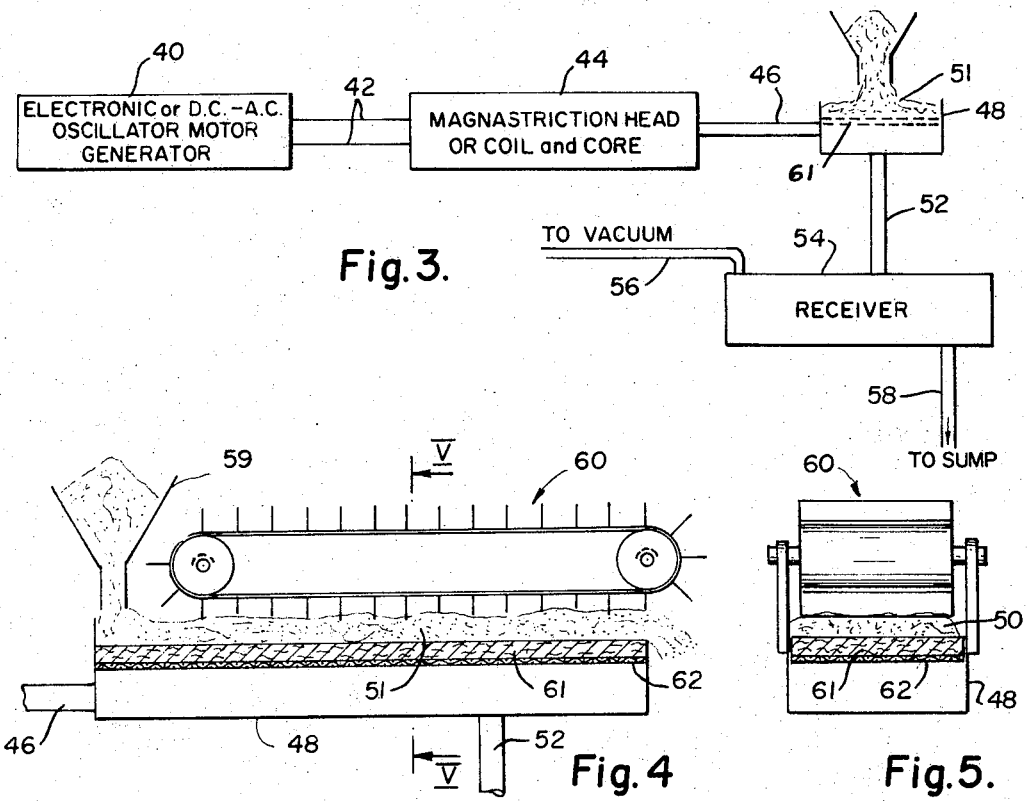
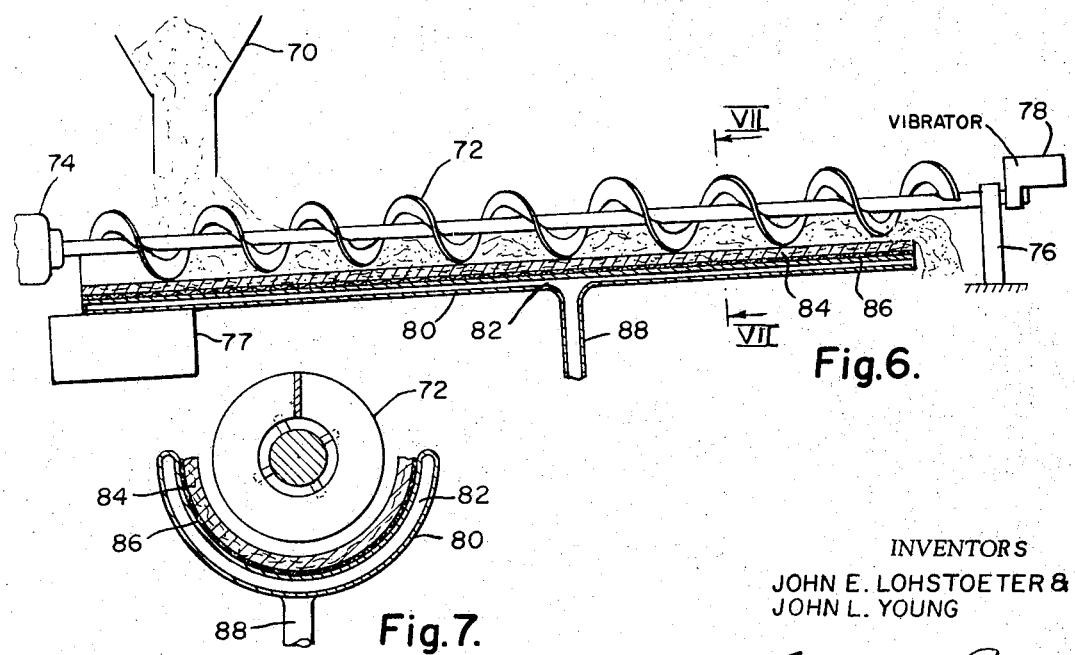
INVENTORS
JOHN E. LOHSTOETER &
JOHN L. YOUNG
ATTORNEY United States Patent Office 3,348,599
Patented Oct. 24, 1967

3,348,599
APPARATUS FOR DEWATERING AND DE-
HYDRATING SLIMES AND THE LIKE
John E. Lohstoeter and John L. Young, Pittsburgh, Pa.,
assignors to Scientism Laboratories, Pittsburgh, Pa.
Filed Apr. 3, 1964, Ser. No. 357,245
2 Claims. (Cl. 159—2)

ABSTRACT OF THE DISCLOSURE

An apparatus for drying sludge comprising a drying chamber, filter means, steam injection means, condenser means, and a ram actuated removal means.

---

This invention relates generally to a method and apparatus for de-watering and converting a liquid-containing refuse material into a useful or more easily transportable product, which refuse material may be in the form of clays, slimes, sludges, muds, silica gels, or industrial refuse containing these materials.

In the cleaning of hot rolled sheet, the iron oxide coating is removed with sulfuric acid. A small plant will consume as much as 200 tons of concentrated acid a day for this purpose and has the problem of disposing of the spent $FeSO_4$ resulting, which may represent as much as 2 million gallons a day of solution. This solution is usually neutralized with lime and results in the formation of a slime which now weighs about 400 tons. The disposal of this quantity of slime each day is quite troublesome.

According to the present invention, we have now developed a use for this material so that it can be sold provided the slime is first dried. The dried slime consists of approximately 75% plaster of Paris and 25% iron oxide, and we have found that this material has good strength and can be used for many purposes where plaster of Paris is now used.

Industrial processes, likewise, often produce industrial refuse that are slimes. These slimes are often dumped on low value land and allowed to accumulate until such times as circumstances require their removal. The material in these dumps can usually be lifted by a dredge and placed in a truck body, freight car, or boat, but as soon as the container is moved the material being moved will become liquid causing a shifting load and leakage. We have found that this condition often exists on "solid material" that contains 50% of water, but that the material usually can be handled if the water can be reduced to 30%. If these slimes are filtered, it will be found generally that the filter will not reduce the water below 50%.

We have made the discovery that if the filter which has produced a cake from which more water cannot be extracted is vibrated at a critical frequency, then an additional amount of water may be extracted, as much as 30%. We have found that a vibrating filter can take the cake from a centrifugal filter and extract an additional amount of water from it.

An object of the present invention is to provide a novel method and apparatus for drying pickle liquor slime so that it will consist of approximately 75% plaster of Paris and 25% of iron oxide, which we have found is a material of good strength which can be used for many purposes for which plaster of Paris is now used.

Another object of the invention is to provide a novel apparatus and method for drying clays, slimes, sludges, muds, silica gels and the like, by spraying or squirting them into a stream of superheated steam and keeping the material suspended long enough to surface-dry the particles of clay or slime on the outside and then allowing the particles to fall on a filter surface through which steam can readily pass to complete the drying operation until the material is bone dry and in the form of a cake several feet thick, at which time it is removed and replaced with a new supply of sludge.

Still another object of the invention is to preliminarily remove a predetermined amount of water from slimes, muds, silica gels, and the like, by vibrating a mass of such material at a critical frequency for the effective particle size of the material, taking into consideration the attractive forces which must be overcome, while such material is deposited on a filtering bed and subjected to vacuum, whereby the material may be more readily handled as refuse material and then more effectively dehydrated by superheated steam by the method and apparatus referred to above.

Other objects and advantages will become more apparent from a study of the following description taken with the accompanying drawings wherein:

FIG. 1 is a schematic view, partly in cross-section, of apparatus for dehydrating sludge and the like by spraying or squirting it in streams or ribbons through a charge of superheated steam;

FIG. 2 is an enlarged, cross-sectional view, taken along line II—II of FIG. 1;

FIG. 3 is a schematic view of apparatus for vibrating sludge or mud while in a bin and deposited on the filter bed and subject to vacuum for de-watering the material before it is passed through superheated steam, as shown in FIG. 1;

FIG. 4 is an enlarged view of the filter bed of FIG. 3 and showing conveyor means for displacing the de-watered sludge while on a filter bed;

FIG. 5 is a cross-sectional view taken along line V—V of FIG. 4;

FIG. 6 is a vertical, cross-sectional view of a modification of the means shown in FIG. 4 for displacing the material while on a filter bed; and, FIG. 7 is a cross-sectional view taken along line VII—VII of FIG. 6.

Referring more particularly to FIG. 1 of the drawing, numeral 10 denotes a liquid-containing waste material, such as pickle liquor slime, or other slime, clay, sludge, mud, silica gel, or industrial waste material containing any of these. The sludge is fed by hopper 50 through a tube 14 is which is rotated a feed screw 12 by means of a motor 16 so as to longitudinally displace or propel the sludge to the left, as viewed in FIG. 1, to exit portion 18 from which it is discharged through a disc 29 having a plurality of extruding holes 30 so as to extrude the material in the form of a plurality of ribbons, like spaghetti or much thinner, and into the path of a charge of superheated steam coming from tube 26. A steam boiler 22 may operate a various pressures, such as 5 lbs. per square inch. After entrained water is removed the steam passes through a gas fired superheater 24 which supplies steam at 1400° F., each pound of which contains approximately 200 B.t.u. of heat which is capable of vaporizing water or heating the solid slime. However, conventional steam pressures of 100 lbs. per square inch may be used instead. The superheater may be heated to 160° C. to effect vaporization of the water in the sludge. However, the superheater may be heated to much higher temperatures, such as about 1000° C.

The sludge may be squirted or sprayed by suitable means into the stream of superheated steam and suspended long enough so as to quickly vaporize the water by large surface exposure of the sludge to the superheated steam while the injected sludge is falling into a drying and reacting chamber 20. This chamber is in the form of a hollow cylinder insulated on the outside and which may be a steel shell internally lined with acid-resisting insulation brick. The top annular flanges 20a have a smoothly ground fit with the flange of the top 21 and that of the bottom 23. The bottom 23 is held tightly against cylinder 20 solely by means of a hydraulic ram 38 contained in a cylinder 36. Since the only means for holding the top 21 and bottom 23 against cylinder 20 is the hydraulic ram, when the piston 38 moves downwardly after thorough dehydration, cylinder 20 may be moved laterally away from the top and bottom by a crane or other power operated means and dumped and then moved back into place were it will again be held tightly against the top and bottom by the hydraulic ram.

A filter assembly 32 is provided in the bottom portion of the drying and reacting chamber 20 for supporting the falling sludge. The filter may comprise a glass cloth which is backed with 80 mesh screen supported on a .5 inch screen which, in turn, is supported on a grizzly bar with 2 inch openings. Such filter, therefore, enables superheated steam to readily flow therethrough and into outlet pipe 34 leading to a condenser so as to thoroughly dry the material which collects on the filter assembly 32 as a cake several feet thick. The main advantage of slowly adding sludge and steam to the drying chamber is that high pressures do not build-up on the filter assembly.

By the above apparatus, the sludge or other liquid waste material may be made even bone dry and in powder form by discontinuing the spraying of the material and allowing the temperature of the superheated steam to rise until the outlet temperature is above the dehydrating temperature by an amount which experience has shown will give a completely dried material. While the superheated steam is flowing through the squirted or sprayed material as its falls onto the filter assembly 32, a gas may be simultaneously introduced through pipe 27 such as air or oxygen, for effecting oxidation of the slime, or a reducing gas, for reduction of the slime. In most instances, however, after the drying process has been completed by superheated steam only, the steam is shut-off and a neutral gas is introduced so as to displace and replace the remaining steam in chamber 20 and thereby prevent ill effects of condensation, etc. Such neutral gas may $CO_2$, natral gas, nitrogen, hydrogen etc.

While a single chamber 20 is shown in the drawing, a plurality of such chambers may be used instead in side-by-side relationship and held closed by a single or multiple rams.

FIG. 3 is a schematic diagram of apparatus for de-watering the sludge before it is introduced into bin 50 shown in FIG. 1 (or for the purpose of making the sludge easier to handle and transport). An electronic or DC-AC oscillator motor generator 40 is used for applying either sonic or super-sonic vibration to supply line 42 connected to a magnastriction head or coil and core 44 which, by means of a rod 46 connected to a trough 48, will vibrate the trough horizontally, that is, at right angles to the direction at which sludge is fed through a funnel onto filter 61. While the filter 61 is being vibrated, water is drawn through pipe 52 into a receiver 54 and thence through outlet pipe 58 to a sump aided by vacuum pressure from a vacuum line 56 connected to the receiver. The frequency may be varied anywhere between 20 cycles to 20,000 cycles per second, depending upon the characteristics of the slime, primarily the effective particle size which takes into account the attractive forces between the particles, affinity for water, etc. There is a critical frequency for different materials at which a maximum amount of water will be extracted as a consequence of simultaneous vibration and application of vacuum.

FIG. 4 shows the trough and filter assembly of FIG. 3 in more detail and illustrates a coarse screen filter 61 on which rests a fine sieve screen or filter pad 61 for supporting a layer 51 of slime, or sludge. A conveyor, generally denoted by numeral 60, will rotate so that spokes or plates thereof will push the layer 50 to the right, as viewed in FIG. 4, so as to be discharged after de-watering and thus effect a continuous de-watering process. The vibration means disclosed in FIG. 3 may be used to vibrate conveyor 60 so that the layer 51 may be vibrated at its critical frequency, rather than vibrating the filter 61, 62. In some cases, however, both the conveyor and filter may be vibrated in phase to more effectively vibrate layer 50, preferably at its critical frequency.

FIGS. 6 and 7 show a modification wherein a helical feed screw 72 driven by a motor 74 is substituted for the conveyor shown in FIG. 4 so as to feed sludge laterally to the right after it is deposited on the filter 84, 86 (similar to 61, 62) by feeding through a hopper 70. The feed screw 72, supported by bearing 76, may be vibrated axially at any selected frequency, such as 1000 cycles per second, by vibrator 78. The trough 80 may be vibrated by a vibrator 77 at the critical frequency of the layer of sludge, preferably, or maybe vibrated about 60 cycles per second. Good results have been obtained by running vibrator 77 at 500 cycles while running vibrator 78 at 1000 cycles per second. During vibration, water is discharged through outlet pipe 88 which is connected to a vacuum and sump assembly, such as pipe 52 and the assembly connected thereto in FIG. 1.

Thus it will be seen that we have provided an efficient method and apparatus for de-watering slimes, sludges, and other liquid-containing wastes by first removing a substantial amount of water by vibration of the sludge at critical frequency while deposited on a filter, and while the extracted water is discharging through a filter and sump under action of a vacuum; furthermore, we have provided an efficient apparatus and method for further de-watering this de-watered sludge by spraying it into a drying or reacting chamber while subjecting it to superheated steam, so as to thoroughly dry the spry or extruded particles as they fall onto a filter in a reaction chamber where they accumulate to a cake of several feet in height, and continuously applying superheated steam as the layer builds up on such filter, until the layer is bone dry, at which time the material may be removed quickly by hydraulic means which detachably holds the parts of a reacting and drying chamber together.

It appears that there exists certain ionic attractions in the slime that can be influenced by vibration. For instance, in neutralized pickle liquor, the gypsum crystals should have colloidal dimensions. Vibration may give them an opportunity to orient into needles or at least to consolidate into a form where the attraction of the particle for the water is reduced. The frequency of the vibration appears to be more effective than the amplitude since it was observed in one test that very successful results were obtained at a high frequency and very low amplitude. When the amplitude was increased at a lower frequency, the results obtained were barely acceptable.

While we have described vibration of the filter and the rake or worm which moves the slime, we have found with some slimes that only the filter or the worm need be in motion.

While we have indicated that the above-described equipment is designed to work on slimes, we have found that it is also very effective in filtering coarser material, although a different frequency of vibration is usually required. For these materials it can be observed that the cake tends to remain open and does not compress as is observed where only vacuum is employed.

We have used the present invention with organic solvents and obtained an increased rate of solvent removal. We believe that here coagulation of the solids into coarser particles was observed.

It is possible that by vibration, small cracks may be opened in the cake allowing a more free passage of air through the cake and increasing de-watering effectiveness.

We have observed the condition where the cake was not vibrated, but suction was applied when no further filtrate flow was observed. If, then, the vibration was applied, a sudden rush of filtrate would occur. It would appear that the capillary openings are consolidated, possibly into larger openings by the vibration.

The filtrate held in a filter cake or the residual saturation depends on the size of the voids in the cake, the pressure gradient and the surface tension of the filtrate plus any ionic attractions that may be involved. The vibration can effect the size of the voids, the pressure gradient and the ionic forces.

While we have illustrated and described several embodiments of our invention, it will be understood that these are by way of illustration only, and that various changes and modifications may be made within the contemplation of our invention and within the scope of the following claims.

We claim:
1. Apparatus for drying sludge, comprising a drying chamber having a top portion including means for extruding the sludge in ribbons while superheated steam is introduced along said ribbons into said chamber so as to surface-dry said ribbons as they fall to form particles on the bottom portion of said chamber, a filter at the bottom portion of said chamber on which the falling particles are collected and supported, and a condenser connected to the bottom portion of said chamber below said filter so that superheated steam is passed through the filter and supported layer of sludge.

2. Apparatus as recited in claim 1 wherein said chamber comprises detachable portions held together solely by a hydraulic ram so that when the ram is retracted, a portion containing dried particles of said sludge may be removed from the remainder of the chamber and dumped.

References Cited
UNITED STATES PATENTS

| | | | |
|---|---|---|---|
| 2,560,807 | 7/1951 | Lobo | 241—1 |
| 2,636,555 | 4/1953 | Klepetko et al. | 159—4 |
| 2,969,111 | 1/1961 | Bocagnano | 159—3 |
| 3,143,497 | 8/1964 | Fuehring | 210—68 X |

NORMAN YUDKOFF, *Primary Examiner.*

SAMIH N. ZAHARNA, *Examiner.*

J. SOFER, *Assistant Examiner.*